(12) United States Patent
Vollmer et al.

(10) Patent No.: US 8,104,739 B2
(45) Date of Patent: Jan. 31, 2012

(54) PULSE VALVE

(75) Inventors: Dirk Vollmer, Achern (DE); Reinhold Weible, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 932 days.

(21) Appl. No.: 10/587,794

(22) PCT Filed: Jun. 8, 2005

(86) PCT No.: PCT/EP2005/052630
§ 371 (c)(1),
(2), (4) Date: Jul. 31, 2006

(87) PCT Pub. No.: WO2006/000526
PCT Pub. Date: Jan. 5, 2006

(65) Prior Publication Data
US 2007/0158603 A1    Jul. 12, 2007

(30) Foreign Application Priority Data
Jun. 26, 2004  (DE) .................. 10 2004 030 976

(51) Int. Cl.
*F16K 31/12* (2006.01)
(52) U.S. Cl. .. 251/50; 251/48; 251/129.15; 251/129.17; 251/331; 137/514.7
(58) Field of Classification Search .................. 251/50, 251/120, 123, 124, 129.01, 129.07, 129.17, 251/282, 331, 48, 52, 129.15; 137/514.7
See application file for complete search history.

(56) References Cited

U.S. PATENT DOCUMENTS

| | | | |
|---|---|---|---|
| 828,374 A * | 8/1906 | Blein et al. ............... | 137/630.15 |
| 1,012,779 A * | 12/1911 | Wilson ............................ | 251/52 |
| 4,190,076 A * | 2/1980 | Cameron et al. ......... | 137/505.45 |
| 4,515,343 A * | 5/1985 | Pischinger et al. ............. | 251/48 |
| 4,794,890 A * | 1/1989 | Richeson, Jr. ............. | 123/90.11 |
| 4,878,650 A | 11/1989 | Daly et al. | |
| 4,889,288 A * | 12/1989 | Gaskell ....................... | 239/533.5 |
| 5,547,165 A * | 8/1996 | Brehm et al. ............. | 251/129.16 |
| 5,832,883 A * | 11/1998 | Bae ............................. | 123/90.11 |
| 6,062,531 A * | 5/2000 | Rapp et al. ....................... | 251/50 |
| 6,328,276 B1 | 12/2001 | Falch | |
| 6,572,074 B2 * | 6/2003 | Yang et al. ....................... | 251/54 |
| 6,681,730 B1 * | 1/2004 | Koneda et al. ............. | 123/90.11 |
| 6,896,236 B2 * | 5/2005 | Wang et al. ................ | 251/30.01 |
| 2004/0155212 A1 * | 8/2004 | Hess et al. ....................... | 251/64 |

FOREIGN PATENT DOCUMENTS

| | | |
|---|---|---|
| DE | 33 10 021 | 9/1984 |
| DE | 197 54 257 | 6/1999 |
| DE | 198 36 562 | 3/2000 |
| EP | 0 289 202 | 11/1988 |
| JP | 58028079 | 2/1983 |
| JP | 2000-505855 | 5/2000 |

* cited by examiner

*Primary Examiner* — John Fristoe, Jr.
*Assistant Examiner* — Marina Tietjen
(74) *Attorney, Agent, or Firm* — Michael J. Striker

(57) ABSTRACT

The present invention relates to a pulse valve (10) with a closing body (18) that cooperates with a valve seat (22) and, in a first switching position, establishes a flow connection between a supply channel (12) and a discharge channel (14) and, in a second switching position, blocks the flow connection. The closing body (18) periodically alternates between the two switching positions during the actuation of the pulse valve (10), its movement being hydraulically damped by a throttle point (70). It is provided that the hydraulic damping occurs only in a subrange of motion (62).

19 Claims, 5 Drawing Sheets ably slower reaction time

PULSE VALVE

RELATED ART

The present invention is directed to a pulse valve according to the preamble of Claim 1.

Pulse valves are used, among other things, for the water-blending of heater output for vehicle heating. They are usually actuated via electromagnets, which optionally move a closing body periodically back and forth between a first and second switching position, optionally in interaction with a valve spring. In the first switching position, a flow connection is established between a supply channel and a discharge channel, while the flow is blocked in a second switching position. The pulse valve is usually designed as a poppet valve, with which, e.g., a valve cone of the closing body interacts with a valve seat. Poppet valves are robust and economical. They seal tightly. The rapid impact of the valve cone against the valve seat and/or the linear solenoid system creates air borne noise and structure borne noise in the opposite direction, however. These noise vibrations produce discomfort. Furthermore, pressure peaks stress the water-conducting components in the circuit and can result in their premature failure, e.g., producing leaks and the like.

A solenoid valve of this type for a fluid-controlled heating and/or cooling system is made known in DE 197 54 257 A1. An electromagnet actuates the closing body in the closing direction, against the force of a valve spring. The velocity of the closing body and the valve stem connected therewith is reduced by a damping device attached to the valve stem or the closing body. This not only prevents post-oscillation of the closing body or valve stem after the valve member lands, but the damping device also brakes the velocity of the solenoid armature, valve stem and valve member while the valve moves. The damping device includes a disk fastened to the valve stem that is guided with slight play in a part of the valve housing, e.g., a damping chamber, filled with fluid. When the damping disk moves, the fluid is displaced from one side of the damping disk to the other through an annular gap. The damping behavior can be "tuned" by adding additional throttle holes in the damping disk. To attain effective damping, it is important to design the annular gap to be as narrow as possible. It is possible, however, for dirt particles in the fluid to become lodged in the annular gap or to collect in the damping cylinder, thereby resulting in wear and impairing the function of the damping device.

ADVANTAGES OF THE INVENTION

According to the prevent invention, the hydraulic damping occurs only in a subrange of motion. In the undamped subrange of the reciprocating motion—which can extend for approximately 0.5 millimeters before the closing body closes—dirt particles can be carried out of the hydraulic damping device, so that deposits are prevented and the throttle cross-sections clean themselves. Wear and malfunctions are prevented as a result. Furthermore, extremely narrow throttle gaps with effective damping can be realized. Strong damping renders it unnecessary to utilize the full stroke when opening pulses are short. This advantageously results in improved disintegration and a rapid reaction when flow quantities are small. The relatively slower reaction time that occurs when flow quantities are greater is offset by the reduced enhancement by the total system, e.g., valve and heat exchanger characteristics.

According to an embodiment of the present invention, the undamped subrange of motion can be attained by enlarging the throttle cross-section after the throttled subrange of motion as the reciprocating motion progresses, or by actuating a bypass—which is parallel to the throttle gap—to open along the unthrottled subrange of the reciprocating motion.

For this purpose, the closing body is advantageously connected with a damping disk provided in a damping cylinder and forms, together with the damping cylinder, a throttle gap around its circumference that expands along a subrange as the reciprocating motion of the closing body progresses. This can take place, e.g., by the fact that the damping cylinder is open on an end face, and the damping disk exits the damping cylinder shortly before the end of the reciprocating motion of the closing body, by way of which the damping effect is eliminated. Since only a very short distance—approximately 0.5 mm—remains to be covered before the closing body lands on the valve seat, it lands on the valve seat at a slow rate of speed, because it cannot accelerate significantly along this short path, due to inertia.

A transition region, in which the throttle effect is reduced, can be advantageously provided between the damped subrange and the undamped subrange of the reciprocating motion. This can be attained, e.g., by expanding the flow cross-section of the damping cylinder continually in a transition region at its open end, e.g., by providing an inner chamfer on the damping cylinder at its open end. The contour of the chamfer can be designed such that a desired decrease in the damping effect is attained. Furthermore, the damping cylinder can include at least one inner groove and/or recess at its open end that expand toward the open side. Depending on the desired course of damping, several grooves and/or recesses can be distributed around the circumference. The damping characteristics in the transition region can also be influenced by the flanks of the groove or the contour of the recess, e.g., by designing them with a bent shape.

According to an embodiment of the present invention, it is provided that the damping cylinder includes an inner annular groove in a middle region, the annular groove being wider than the thickness of the damping disk. As a result, the closing body is optimally damped at its end positions, while, in an undamped region in a middle position, fluid can flow through the damping cylinder via the annular groove. It is also advantageous in this case for the flanks of the annular groove to be transition regions, to prevent discontinuities in the damping characteristics.

A bypass can be provided instead of the annular groove, the bypass leading into the damping cylinder at a point where the undamped subrange of motion is to begin. The bypass bridges the throttle gap in the undamped subrange of motion and ensures that fluid flows through the damping cylinder.

The damping characteristics can be modified via the shape and size of the damping disk. For example, the damping disk can include an axially projecting edge around its circumference, via which the axial extension of the throttle gap is increased. Furthermore, the damping disk can have a non-circular surface, e.g., a surface designed as an oval, an ellipse, a regular or irregular polygon, or a section of a circle. In this manner, the length of the sealing gap around the circumference can be varied. In addition, the ratio of the volume displaced by the damping disk to the length of the throttle gap can be changed in this manner. Furthermore, the damping disk can be very thin and have a fine, perforated structure. Fluid flows freely through the holes—the cross section of which is advantageously in the micrometer range—when the damping disk moves back and forth. A certain elasticity of the damping disk and the associated slight bending prevent the throttle channels from becoming clogged.

Instead of using the damping disk, the hydraulic throttling can be attained via a fluid-permeable diaphragm connected at its circumference with the valve housing, while its middle region is carried along by the valve stem or a rod connected therewith in the direction of the reciprocating motion. The diaphragm can be semi-rigid and elastic. Its elasticity properties are matched to the desired damping characteristics of the closing body. In particular, the diaphragm will exert only a slight pressure on the fluid in the undamped subrange of motion of the closing body and therefore produce negligible damping. The diaphragm is advantageously made of plastic or metal threads with a fine-meshed network or woven structure, the cross section of the fluid channels formed by the mesh of the weave advantageously lying in the micrometer range.

The undamped subrange of the reciprocating motion can also be attained using a corresponding passage between the valve stem or the rod connected therewith, and the damping disk or the diaphragm. The diaphragm or the damping disk follows the reciprocating motion of the closing body through the passage only along the damped subrange of motion, while, in the undamped subrange of motion, it slides on the valve stem or the rod connected therewith and therefore produces no damping. The damping disk or the diaphragm is coaxial with the valve stem in the direction of flow in front of or behind the closing body. Advantageously, they are installed in an expanded valve chamber in the valve housing, since, when space is well-utilized, large diameters or surfaces can be realized here that are larger than the corresponding sizes of the closing body. They make good damping possible.

DRAWING

Further advantages result from the description of the drawing, below. Exemplary embodiments of the present invention are shown in the drawing. The drawing, the description and the claims contain numerous features in combination. One skilled in the art will also advantageously consider the features individually and combine them to form further reasonable combinations.

DETAILED DESCRIPTION OF THE EXEMPLARY EMBODIMENTS

Figure 1:
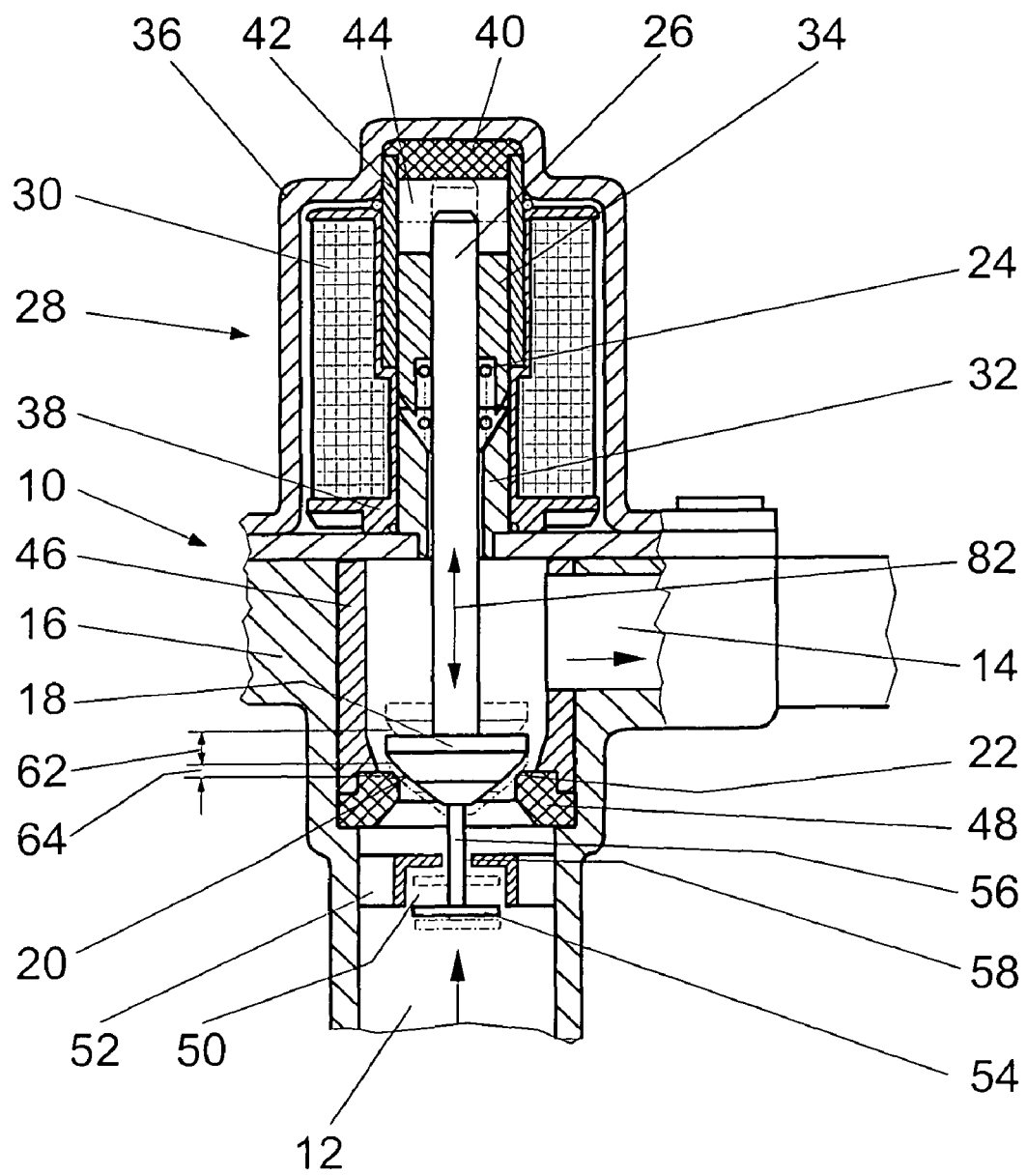
FIG. 1 shows a schematic, longitudinal cross section through a pulse valve.

A pulse valve 10 includes a valve housing 16 with a supply channel 12 and a discharge channel 14. The flow through pulse valve 10 is controlled by a closing body 18, the valve cone 20 of which interacts with a valve seat 22 on an annular valve seat 48 formed in a valve-seat housing 46 in valve housing 16. When closing body 18 is actuated, it is moved periodically, back and forth, between an opened position and a closed position, making a reciprocating motion 82. An intermediate position of closing body 18 is indicated in FIG. 1 with a solid line, while the closed position is indicated by a dash-dotted line, and the opened position is indicated by a dashed line. The flow rate per unit time is determined essentially by the ratio of the "opened" times to the "closed" times during actuation of the pulse valve. The direction of flow is indicated by arrows. Fluid can also flow in the opposite direction through pulse valve 10.

A damping disk 54 is connected with closing body 18 via a rod 56. To keep the moving masses to a minimum, they can be designed thin and made of a lightweight structural material, e.g., a plastic or a composite material. Damping disk 54 interacts with a damping cylinder 50, with which it forms a throttle gap 70 around its circumference when it moves inside damping cylinder 50. Damping cylinder 50 is closed on an end face, except for a guide opening 58, in which rod 56 is guided. Damping cylinder 50, which is installed in supply channel 12 via ribs 52 (FIG. 1), is matched to rod 56 and damping disk 54 such that the hydraulic damping acts only on a portion of full stroke 60. In the embodiment shown in FIG. 1, damping disk 54 is located in damping cylinder 50 in a damped range 62 of full stroke 60, while, in a subsequent, undamped range 64, it is located outside of damping cylinder 50, so that fluid can flow through the interior of damping cylinder 50 through the enlarged throttle gap cross-section and remove any dirt particles that may be present. This results in low wear and longer valve service lifes. When closing body 18 reopens, damping disk 54 re-enters damping cylinder 50, and the desired damping is attained again.

Closing body 18 is advantageously actuated in the closing direction by an electromagnet 28 against the force of a valve spring 24. When current supply to electromagnet 28 is interrupted, closing body 18 opens, thereby ensuring that flow will always occur when used in a heating and/or cooling circuit.

Electromagnet 28 has a solenoid coil 30 wound onto a magnetic yoke 38. A guide bushing 42 is installed in magnetic yoke 38, in which an armature 34 is located such that it is axially displaceable. Valve spring 24 applies force to guide bushing 42 in the opening direction. Armature 34 is mounted on a valve stem 26 that is connected with closing body 18 and damping disk 54. When solenoid coil 30 is energized, armature 34 is pulled by a magnet core 32, so that closing body 18 is pressed via valve stem 26 against valve seat 22. Armature space 44 is provided in guide bushing 42 to allow armature 34 to move freely, armature space 44 being limited at one end, e.g., by an elastic stop 40. It is struck by the exposed end face of valve stem 26 when pulse valve 10 is in the opened position. The parts of electromagnet 28 are accommodated in a housing 36 that is mounted on valve housing 46. Although pulse valves 10 are typically driven by electromagnets, it is also possible to use other electric-motor, mechanical or hydraulic actuators.

Figure 2:
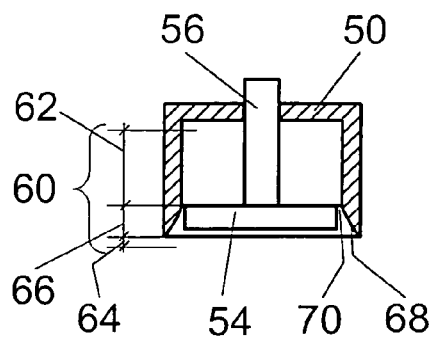
FIG. 2 shows an enlarged longitudinal cross section of a damping cylinder.

In the embodiment in FIG. 2, damping cylinder 50 has a transition region 66 between damped part 62 and undamped part 64, in which reduced, modified damping is attained.

Figure 3:
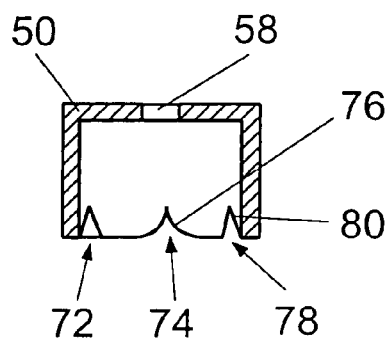
FIGS. 3 through 5 are variations of FIG. 2.

The cross section of throttle gap 70 is expanded continually via a chamfer 68 until undamped range 64 is reached. Chamfer 68 can have a straight or bent shape, e.g., a convex or concave shape, in the axial direction. Transition region 66 can also be attained using one or more grooves 72, via which the throttling effect of throttle gap 70 gradually decreases until it reaches unthrottled range 64. The flanks of groove 72 can also be straight or bent in shape. A similar effect can be attained via recesses 74 and 78, recess 74 having a bent boundary contour 76, and recess 78 having a straight boundary contour 80 (FIG. 3). The damping characteristics in transition region 66 can thereby be modified within wide limits.

Figure 4:
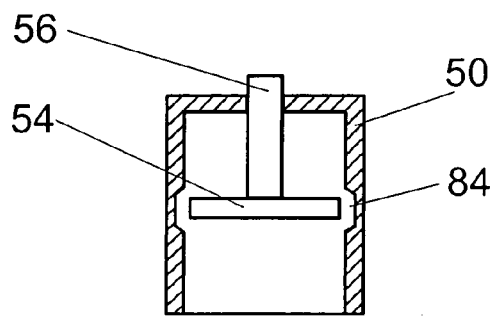

In the embodiment shown in FIG. 4, damping disk 54 does not exit damping cylinder 50. Undamped part 64 is located nearly in the center of full stroke 60, while damped parts 62 are located at the ends of full stroke 60. Undamped part 64 is realized using an annular groove 84 that is located in the center region of damping cylinder 50 and is wider than the thickness of damping disk 54. Fluid can flow easily through damping cylinder 50 due to the markedly larger flow cross-section in the region of annular groove 84, thereby preventing dirt particles from depositing. In this case, a transition region can be designed in both stroke directions via the design of the flanks of annular groove 84. There are similar possibilities for this, e.g., as shown in FIG. 2 and FIG. 3 for the end region of damping cylinder 50.

Figure 5:
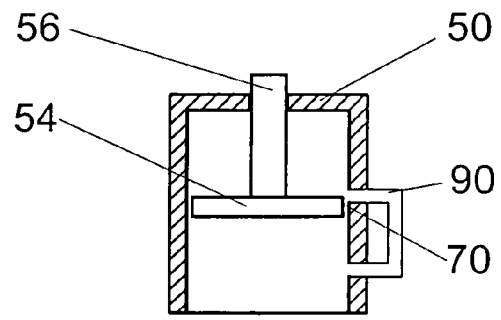

A bypass 90 can be provided instead of annular grooves 84 (FIG. 5), bypass 90 leading into damping cylinder 50 at the beginning of the unthrottled subrange of motion and bridging throttle gap 70 around the circumference of damping disk 54. Dirt particles can be carried out of damping cylinder 50 via the bypass.

Figure 6:
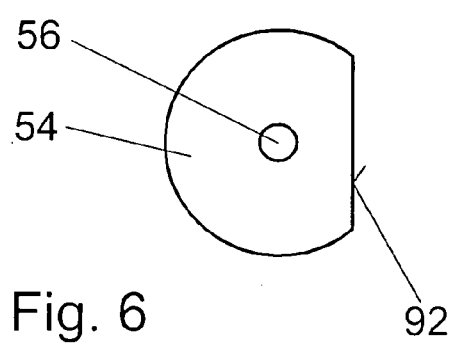
FIGS. 6 and 7 are a top view of a damping disk.
Figure 7:
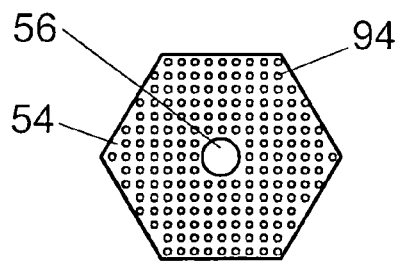
Figure 8:
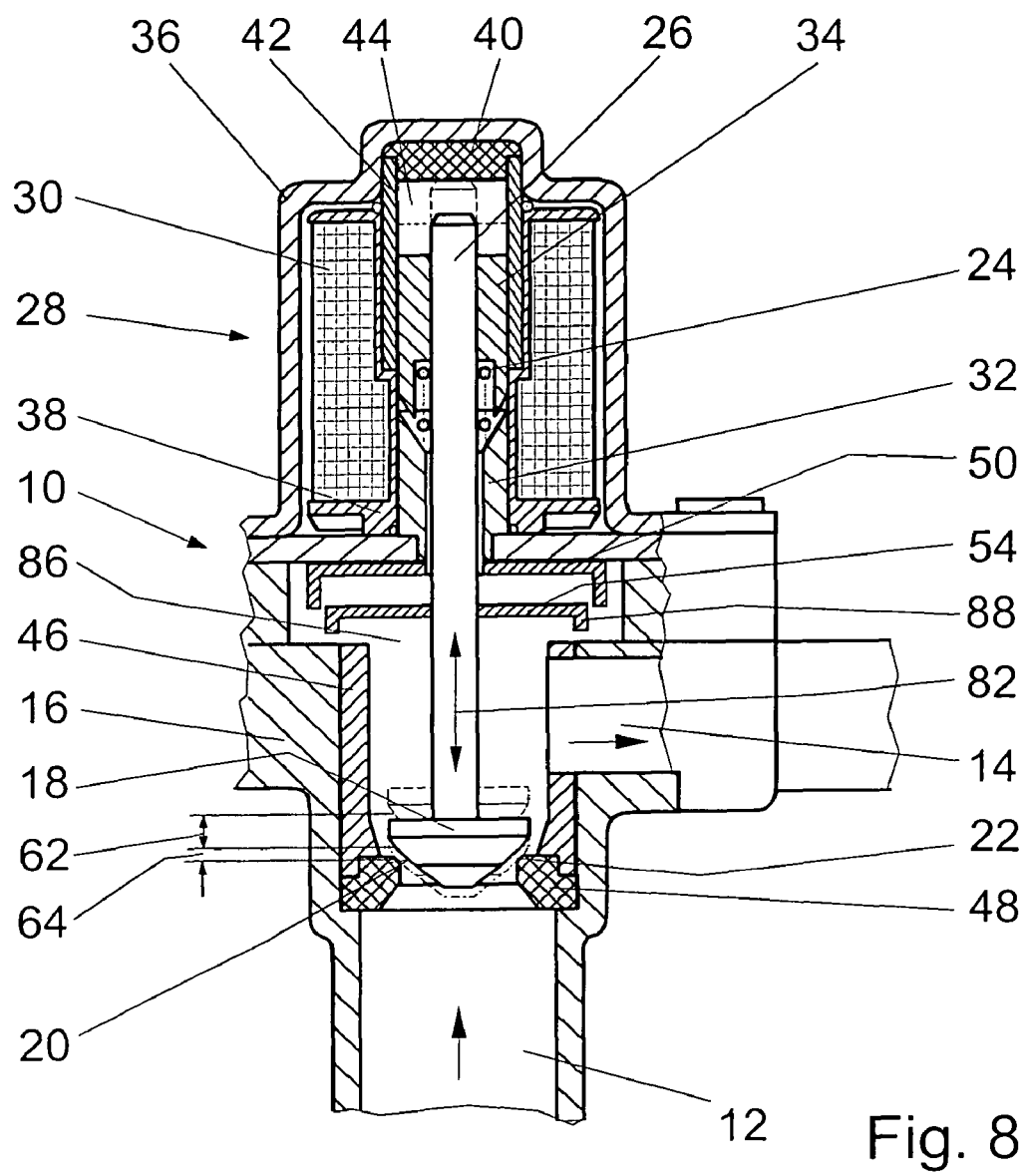
FIGS. 8 and 9 are variations of FIG. 1.

The damping characteristics can be modified via the shape and size of the damping disk. In the exemplary embodiments shown in FIGS. 6 and 7, the surface of damping disk 54 is not circular. In the embodiment shown in FIG. 6, damping disk 54 has a flat section 92 on its circumference, while damping disk 54 shown in FIG. 7 is a regular hexagon. Other shapes can be selected, however, such as an oval or any regular or irregular polygons. The shape of the surface of damping disk 54 can be used to modify the relationship between the surface area and the length of the circumference, and damping disk 54 can make optimal use of the available installation space. With an embodiment shown in FIG. 8, for example, damping disk 54 can be installed in an expanded valve space 86 in valve housing 16. As a result, it can have a much larger diameter or a much larger surface area than closing body 18. With the selected flow direction of pulse valve 10, valve space 86 is located on the discharge side of closing body 18. Furthermore, damping disk 54 includes an axially projecting edge. As a result, sealing gap 70 around the circumference of the damping disk becomes longer in the axial direction in damped subrange 62. Since sealing gap 70 shortens continually when damping disk 54 exits damping cylinder 50, a transition region in the damping characteristics is also produced. Edge 88 increases the movable mass of damping disk 54 only slightly.

The damping characteristics of damping disk 54 can be modified further using additional throttle openings in the form of holes 94. Damping disk 54 shown in FIG. 7 has a fine, perforated structure, with which the diameter of holes 94 can lie in the micrometer range.

Figure 9:
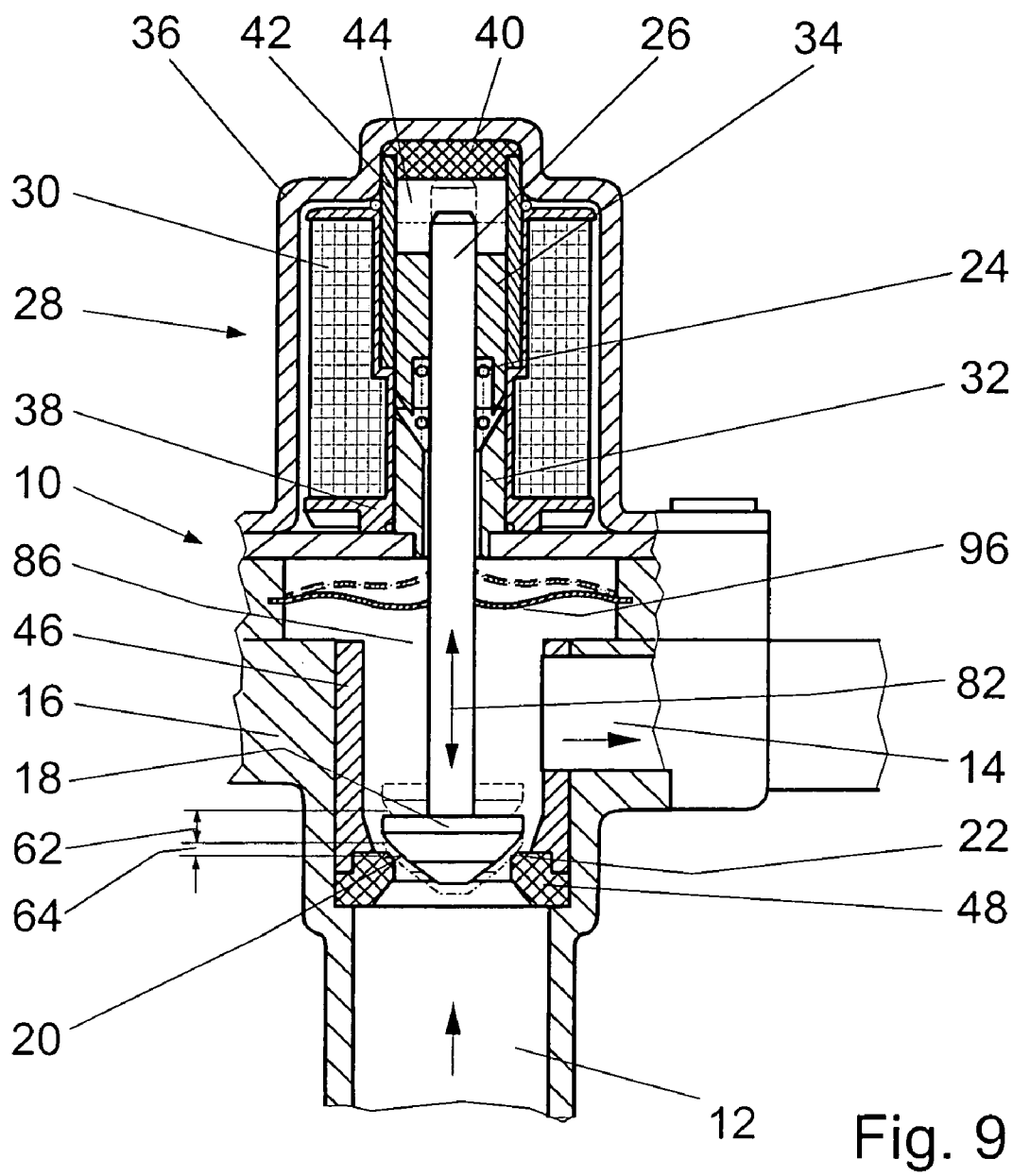

According to an embodiment shown in FIG. 9, a fluid-permeable diaphragm 96 can be used instead of damping disk 54. It can be composed of thin, wavy spring steel, and is clamped between valve housing 16 and valve stem 26. The fluid channels can be formed by a perforated structure, similar to damping disk 54 shown in FIG. 7. Diaphragm 96 depicted with solid lines shows a position at the end of the damped region, while an embodiment shown with dashed lines depicts pulse valve 10 in an opened position. The elasticity properties of diaphragm 96 can be matched to the desired damping characteristics of closing body 18, so that, in particular, the diaphragm exerts only an insignificant amount of pressure on the fluid in undamped subrange 64, therefore resulting in negligible damping.

Figure 10:
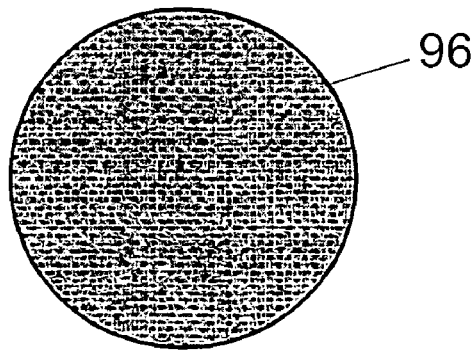
FIG. 10 is a top view of a diaphragm with a woven structure.

In the embodiment shown in FIG. 10, diaphragm 96 has a fine-meshed network structure or a woven structure. The size of the fluid channels formed by the mesh of the structure is advantageously in the micrometer range. In this case as well, the elasticity properties of diaphragm 96 are matched to the desired damping characteristics of closing body 18.

Figure 11:
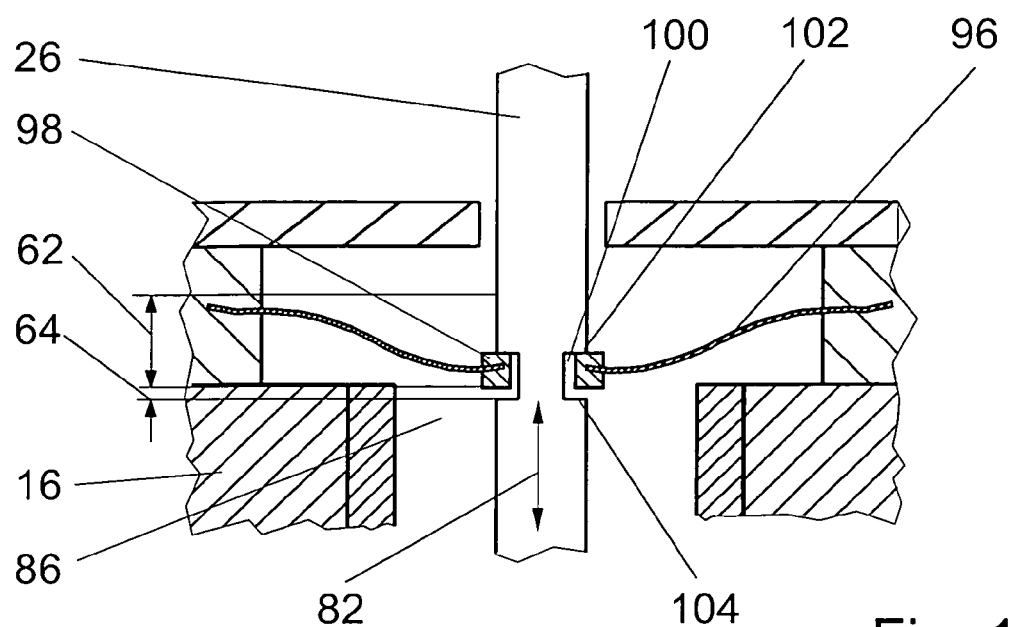
FIGS. 11 and 12 show a partial, longitudinal sectional view through a damping device with a passage.
Figure 12:
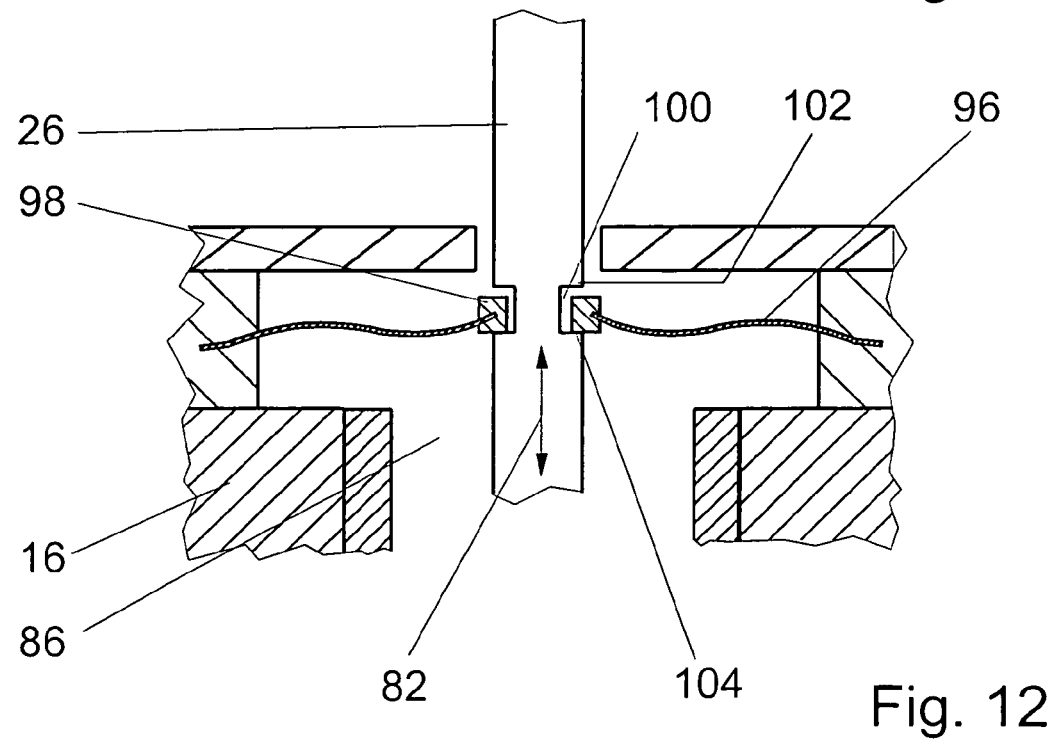

In an embodiment shown in FIG. 11 and FIG. 12, diaphragm 96 is coupled with valve stem 26 via a passage. The passage is formed by a recess 100 in valve stem 26 and a driving ring 98. The axial extension of recess 100 is greater than the axial extension of driving ring 98, so that an axial passage is formed between driving ring 98 and recess 100 that is passed through in the reversing positions of a reciprocating motion 82 and results in an undamped subrange 64 of closing body 18. FIG. 11 shows a closed position of pulse valve 10, with which driving ring 98 bears against an upper shoulder 102 of recess 100. FIG. 12 shows an opened position of pulse valve 10, with which driving ring 98 bears against a lower shoulder 104 of the recess. The passage can also be formed by other means, e.g., upper shoulder 102 and/or lower shoulder 104 can be formed by a projection of valve stem 26 or a lock washer.

What is claimed is:

1. A pulse valve (10) with a closing body (18) that cooperates with a valve seat (22) by at least a valve spring (24) and, in a first switching position, establishes a flow connection between a supply channel (12) and a discharge channel (14) and, in a second switching position, blocks the flow connection, the closing body (18) periodically moving in a reciprocating motion (82) between the two switching positions during an actuation of the pulse valve (10), wherein a hydraulic damping to a movement of the closing body (18) by a throttle gap (70) occurs in a damped range (62),
 wherein the closing body (18) is connected via a rod (56) with a damping disk (54) made of structural material, the damping disk (54) provided in a damping cylinder (50) that is open on a first end face and, except for a guide opening (58), in which the rod (56) is guided, closed on a second end face being located opposite to the first end face, and
 wherein the damping disk (54) exits the damping cylinder (50) shortly before the closing body reaches the second switching position.

2. The pulse valve (10) as recited in claim 1, wherein the reciprocating motion progresses from the first switching position to the second switching position sequentially through the damped range, a transition region (66), and an undamped range (64) that extends for approximately 0.5 millimeters before the closing body reaches the second switching position.

3. The pulse valve (10) as recited in claim 2, wherein the throttle gap expands during the transition region as the reciprocating motion progresses towards the second switching position.

4. The pulse valve (10) as recited in claim 3, wherein the hydraulic damping is attained again when the damping disk re-enters the damping cylinder (50).

5. The pulse valve (10) as recited in claim 3, wherein the flow cross section of the damping cylinder (50) expands continually at its open end.

6. The pulse valve (10) as recited in claim 5, wherein the damping cylinder (50) includes an inner chamfer (68) at its open end.

7. The pulse valve (10) as recited in claim 5, wherein the damping cylinder (50) includes at least one inner groove (72) and/or recess (74, 78) at its open end that expand in the direction toward the open end face.

8. The pulse valve (10) as recited in claim 7, wherein the flanks of the groove (72) and the contour (76, 80) of the recess (74, 78) have a bent shape.

9. The pulse valve (10) as recited in claim 3, wherein the damping cylinder (50) includes an inner annular groove (84), the width of which is greater than the thickness of the damping disk (50) at its circumference.

10. The pulse valve (10) as recited in claim 9, wherein the flanks of the annular groove (84) are transition regions (66).

11. The pulse valve (10) as recited in claim 1, wherein a bypass (90) extending in parallel with the throttle gap (70) is actuated to open along the undamped range (64).

12. The pulse valve (10) as recited in claim 1, wherein the damping disk (54) includes an axially projecting edge (88) around its circumference.

13. The pulse valve (10) as recited in claim 1, wherein the damping disk (54) has a surface that is not circular.

14. The pulse valve (10) as recited in claim 1, wherein the damping disk (54) is very thin and has a fine, perforated structure.

15. The pulse valve (10) as recited in claim 14, wherein the cross section of holes (94) of the fine, perforated structure is in the micrometer range.

16. The pulse valve (10) as recited in claim 14, wherein the fine-meshed network structure forms a mesh with the cross section in a micrometer range.

17. The pulse valve (10) as recited in claim 2, wherein the undamped range (64) is formed by a passage between the rod (26) and the damping disk (54).

18. The pulse valve (10) as recited in claim 1, wherein the damping disk (54) is coaxial with the rod (26) in the direction of flow in front of or behind the closing body (18).

19. The pulse valve (10) as recited in claim 1, wherein a surface of the damping disk (54) is larger than a cross section of the closing body (18).

* * * * *